F. MARION.
CRANK LOCK.
APPLICATION FILED OCT. 29, 1913.
1,101,650.
Patented June 30, 1914.
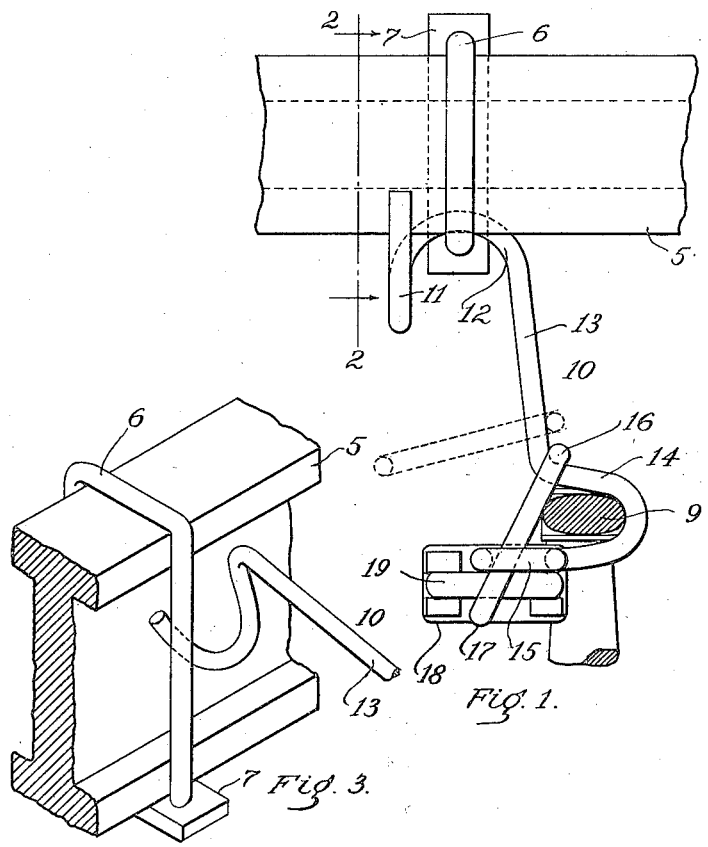
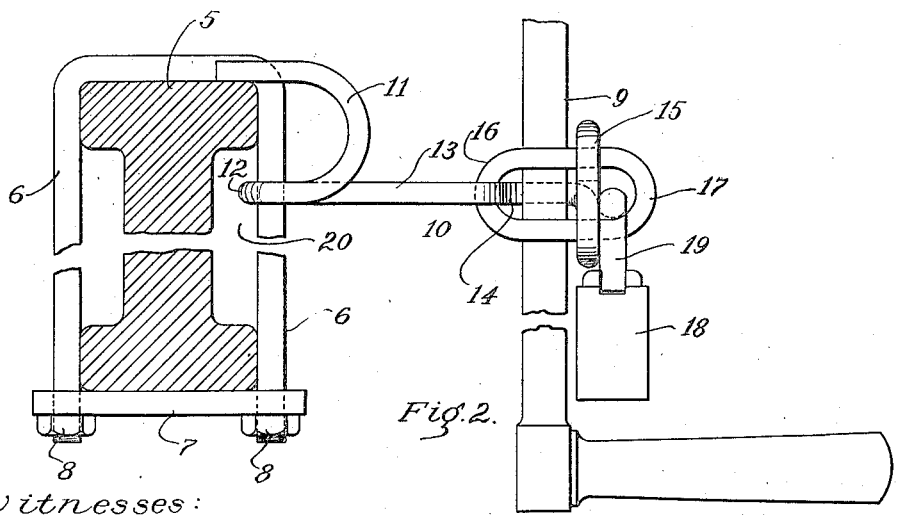
Witnesses:
Ambrose E. Sullivan
Leonard A. Powell
Inventor:
Frank Marion
by his attorney, Charles J. Gooding

UNITED STATES PATENT OFFICE.

FRANK MARION, OF KINGSTON, MASSACHUSETTS.

CRANK-LOCK.

1,101,650.

Specification of Letters Patent.  Patented June 30, 1914.

Application filed October 29, 1913. Serial No. 798,013.

*To all whom it may concern:*

Be it known that I, FRANK MARION, a citizen of the United States, residing at Kingston, in the county of Plymouth and State of Massachusetts, have invented new and useful Improvements in Crank-Locks, of which the following is a specification.

This invention relates to a lock for preventing the cranking of an internal combustion engine. The same is adapted to be used with automobiles, motor boats or vehicles of any kind in which an internal combustion engine is employed and which has a crank adapted to rotate the shaft of said internal combustion engine in order to give the same its initial rotation, or in other words to perform what is known as cranking the engine.

The object of the invention is to provide a simple device which can be easily applied to the crank of an internal combustion engine and the device is particularly adapted to be used for automobiles whereby the crank may be locked against rotation and thus unauthorized persons prevented from starting the engine and stealing the automobile.

The invention consists in a lock formed as hereinafter described in the specification and particularly pointed out in the claims.

Referring to the drawings: Figure 1 is a plan view of my improved lock showing the same attached to the front axle of an automobile and connected to a crank which is shown broken off and partly in section. Fig. 2 is a sectional elevation taken on line 2—2 of Fig. 1; parts of the figure being broken away to save space. Fig. 3 is a perspective view of a portion of the lock illustrating the same as it is being connected to the front axle of an automobile.

Like numerals refer to like parts throughout the several views of the drawings.

In the drawings: 5 represents the front axle of an automobile.

6 is a U-shaped bracket which straddles the axle 5 and is locked thereto by means of a cross plate 7 and nuts 8, the ends of the legs of the bracket 6 being preferably upset or slightly headed over to prevent removal of the nuts 8 therefrom.

9 is a crank such as is used in cranking the engine of an automobile.

10 is a connection forming a part of my improved lock and consisting preferably of a wire bent at one end thereof in a vertical plane to form a U-bend 11. Said wire is then bent laterally to form a U 12 lying in a horizontal plane, and thence extending in a substantially straight line, forming a body portion 13, to another lateral U-shaped bend 14, one leg of said last-named U-bend being extended and bent in a vertical plane to form an eye 15. The crank 9 extends upwardly through the U-shaped bend 14 and is held in said U-shaped bend by a link 16 which extends through the eye 15 across the open side of said U 14 which it engages at its juncture with the body portion 13, the opposite end of said link projecting at 17 through and beyond the eye 15.

To lock the parts in position any suitable locking device may be employed; in the present instance, a padlock 18 is illustrated as performing such function and the shackle 19 of said padlock extends through the link 16 outside the eye 15. The U-shaped bend 12, when the parts are in operative position, projects through the space 20 between the axle 5 and one of the legs of the bracket 6, while the upper end of the U-shaped bend 11 rests upon the top of said axle. In connecting the lock to the crank the U-shaped bend 11 is inserted as illustrated in Fig. 3 and then turned to bring it into the position illustrated in Figs. 1 and 2, with the free end of the bend 11 resting on top of the axle 5. The crank 9 is then thrown into the bend 14 as illustrated in Fig. 1. At this time the link 16 has been slipped over the eye 15 along the bend 14 and on to the body portion 13 in the position illustrated in dotted lines, Fig. 1. Said link is now taken and the end 17 thereof slipped through the vertical eye 15, assuming the position illustrated in Figs. 1 and 2. The shackle 19 of the padlock 18 is then slipped through the projecting portion of the link 16 and thus locks the crank against rotation, as it will be obvious that if an attempt were made to rotate said crank it would be prevented by the connection 10 where the U-shaped bend 12 engages said bracket.

While I have illustrated my invention as being attached to a bracket on the front axle of an automobile, it is evident that the connection 10 might be attached to some other portion of the automobile which is stationary relatively to said crank and secure the same result. Moreover, while I have illustrated my invention as being particularly adapted to use with automobiles, it is evident that the same may be used in connection with internal combustion engines such as are used on motor boats or for any purpose whatever, without departing from the spirit of my invention.

I claim:

1. A locking device for the starting crank of an internal combustion engine embodying a connection with a hook at one end thereof adapted to engage a relatively stationary member and with a hook adjacent to the opposite end thereof adapted to engage said crank, said connection terminating in an eye, a link extending across the open side of said last named hook and projecting through said eye, and a lock member engaging said link outside said eye, whereby said crank may be locked within said last-named hook.

2. A locking device for the starting crank of an internal combustion engine embodying a connection with two bends therein, constituting hooks and located adjacent to the opposite ends respectively of said connection and lying in substantially the same plane, the free end of one end of said connection extending from one of said hooks in a plane at an angle thereto and forming a U-bend, and the other end of said connection terminating in an eye adjacent to the other of said hooks and means to lock said crank in said last-named hook.

3. A locking device for the starting crank of an internal combustion engine embodying a connection with two bends therein, constituting hooks and located adjacent to the opposite ends respectively of said connection and lying in substantially the same plane, the free end of one end of said connection extending from one of said hooks in a plane at an angle thereto and forming a U-bend, and the other end of said connection terminating in an eye adjacent to the other of said hooks, a link extending through said eye and across the open side of the hook adjacent to said eye, said link projecting outwardly beyond said eye and a locking member projecting through said outwardly projecting portion, whereby said crank may be locked within said last named hook.

4. A locking device for the starting crank of an internal combustion engine embodying a wire bent at one end thereof in a vertical plane to form a U, thence bent laterally to form a U in a horizontal plane, thence extending in a substantially straight line forming a body portion to another laterally U-shaped bend, one leg of said last named U being bent in a vertical plane to form an eye, and a link located in a vertical plane and extending through said eye across the open side of said last named U and projecting outwardly beyond said eye and a locking member projecting through said outwardly projecting portion.

In testimony whereof I have hereunto set my hand in presence of two subscribing witnesses.

FRANK MARION.

Witnesses:
CHARLES S. GOODING,
SYDNEY E. TAFT.